United States Patent Office 2,876,840
Patented Mar. 10, 1959

2,876,840

ASPHALT PLUGGING OF GAS ZONES

Virgil J. Berry, Jr., Tulsa, Okla., assignor to Pan American Petroleum Corporation, Tulsa, Okla., a corporation of Delaware No Drawing. Application June 24, 1957
Serial No. 667,686

10 Claims. (Cl. 166—22)

This invention relates to decreasing the permeability of formations penetrated by wells. More particularly, it relates to plugging gas producing zones of oil wells.

Several sources of energy are available for forcing oil to flow from an oil-bearing formation to a well from which the oil can be recovered. One of the principal sources of energy in many reservoirs is the high pressure gas in the reservoir. If this gas is produced rapidly from a well the reservoir energy may be quickly depleted, leaving a large percentage of unrecovered oil in the formation. For this reason it is desirable to decrease the rate of production of gas from the reservoir. Many processes have been proposed for plugging off the gas. For example, a solution of asphalt in a solvent such as carbon tetrachloride may be injected into a gas zone. Dilution of the solution by gas dissolving in the solution may cause precipitation of some of the asphalt to decrease the permeability of the gas zone and thus reduce the amount of gas produced with the oil. In some cases further precipitation occurs due to evaporation of the carbon tetrachloride. This process has several advantages. The asphalt is inexpensive, it forms a permanent plug in the gas zone and if it is deposited in the oil zone, the oil flowing through the zone removes the precipitated asphalt, restoring the permeability of the oil zone.

The principal disadvantage of the method using solutions of asphalt lies in the limited solubility of asphalts in solvents. Asphalts form saturated solutions in carbon tetrachloride, for example, containing only 20 to 25 percent asphalt. If all the asphalt could be precipitated, a reasonably effective plug might be formed. Complete precipitation, however, is rarely possible. In addition, it must be noted that asphalt is made up of two principal ingredients, asphaltenes and maltenes. Only the asphaltenes are solids. The maltenes are liquids which are highly soluble in any liquid hydrocarbons which are present. Therefore, only a small amount of the maltenes are thrown out of solution with the asphaltenes. This still further reduces the amount of precipitate obtainable. The degree of decrease in permeability of zones plugged by this method is correspondingly reduced.

An object of my invention is to provide a method and composition suitable for forming a more effective asphalt plug in formations penetrated by wells, particularly at high bottom hole temperatures. A more specific object is to provide a composition for plugging gas zones of oil wells, the composition containing a high concentration of asphalt which can be precipitated in the pores of the gas producing zone. Another specific object of my invention is to provide a method for preparing the treating compositions containing high concentrations of asphalt, and an improved method for causing the asphalt to precipitate in the pores of the formation into which the composition is injected. Other objects will be apparent to those skilled in the art from the following description and claims.

In general, I accomplish the objects of my invention by taking advantage of the naturally colloidal nature of certain portions or ingredients of the asphalt. That is, a colloidal dispersion of these ingredients is injected into the formation. The colloidal particles are caused to flocculate or coagulate in the formation. The resulting large particles precipitate from the dispersion to plug the pores and flow channels of the formation to recrease the permeability of the treated zone.

The term "asphalt" covers materials of widely varying compositions and properties. For my purposes, an analysis of asphalts according to the solubility of the ingredients in various solvents is most useful. This analysis is described in The Properties of Asphaltic Bitumen, by J. Ph. Pfeiffer, Elsevier Publishing Company, Inc., 1950. The ingredients and their definitions, according to this classification are as follows:

(1) Carboids—insoluble in carbon disulfide.
(2) Carbenes—soluble in carbon disulfide, insoluble in carbon tetrachloride.
(3) Asphaltenes—soluble in carbon tetrachloride, insoluble in low boiling saturated hydrocarbons.
(4) Maltenes—soluble in low boiling saturated hydrocarbons.

The carboids and carbenes are present in only minor amounts even in blown asphalt and are rarely present at all in unblown asphalts produced from crude petroleum in refineries. Carboids and carbenes can usually be ignored for my purposes. The important ingredients are the asphaltenes and the maltenes.

Asphaltenes are high melting point, organic solids which normally occur in crude petroleum as a colloidal dispersion rather than as a true solution. Even when concentrated in asphalt, road oil, or the like, most of the asphaltenes remain so highly dispersed that individual particles cannot be seen even with the aid of a 400 power microscope.

In crude petroleum some of the maltenes are adsorbed on the surfaces of the asphaltene particles and are even thought to be present to some extent within the asphaltene particles themselves. The remaining maltenes are distributed in solution throughout the liquid portion of the crude oil. The adsorbed maltenes are in equilibrium with those in the liquid phase.

Asphaltene particles tend to flocculate when the quantity of adsorbed maltenes is decreased. Such a decrease can be caused by upsetting the equilibrium between adsorbed and unadsorbed maltenes. This may conveniently be accomplished by adding a low boiling hydrocarbon such as pentane to the dispersion of asphaltenes. This shifts the equilibrium in part by decreasing the maltene concentration in the liquid phase by a dilution effect. In addition, and more important, the maltenes are much more soluble in low boiling hydrocarbons than in the higher boiling ones normally present in crude petroleum. Therefore, the distribution coefficient for the adsorbed and unadsorbed maltenes is changed to favor less adsorbed maltenes and more distributed in the liquid. Due both to the dilution effect and change in distribution coefficient, maltenes are removed from the asphaltenes, permitting the latter to flocculate. A more detailed account of the above theory, together with a summary of information supporting the theory is to be found in the Journal of Physical Chemistry, volume 44 (1940), page 139, in an article by Pfeiffer and Saal.

The nature and amount of asphaltenes, maltenes and carrier liquid or vehicle may vary widely in my method. The treating dispersion containing these three components will be suitable for my purposes so long as an available maltene solvent or diluent can cause sufficient precipitation of the asphaltenes in the formation. Many asphalt base crude petroleum oils are suitable as treating dispersions for my purposes. Examples include crude oils from the Pollard Field, Alabama, the Little Buffalo Basin Field, Wyoming, and the Grass Creek Field, Wyoming. Examples of suitable diluents include natural gasoline, pentane, ethers such as diethyl ether and alcohols such as butanol.

Other light solvents will occur to those skilled in the art. The material should simply be a good solvent for maltenes, but not a good solvent for asphaltenes. That is, it should be a selective solvent for maltenes. Whether a particular solvent is a good one for maltenes is best determined by the asphaltene precipitation test described below. If the solvent will cause precipitation of asphaltenes from an asphalt dispersion, it is a good maltene solvent for my purposes. Many maltene solvents also have some ability to dissolve asphaltenes. Such solvents may still be suitable for my purposes so long as 100 ml. of the solvent will dissolve no more than about 50 percent of a 2 gram asphaltene sample. A diluent is considered not to be a good solvent for asphaltenes if it meets this requirement.

To determine if a particular asphalt dispersion and diluent are suitable for use as the two liquids in my method, equal volumes of the dispersion and diluent may be mixed at approximately the temperature of the gas-bearing formation to be plugged. If a precipitate forms, some plugging of the formation will occur when the dispersion and diluent are injected separately into the gas zone. To obtain a more quantitative idea of the degree of plugging which will occur, the amount of precipitate should be measured. A very rough estimate can sometimes be made by mixing the dispersion and diluent in a graduated vessel such as a graduated cylinder or centrifuge tube, allowing the mixture to stand for about 24 hours, and observing the volume of the precipitate. A more accurate estimate can be made by centrifuging the mixture before observing the volume of precipitate. I prefer, however, allowing the mixture to stand for about 12 to 24 hours to permit good flocculation of the asphaltenes, filtering the precipitate from the liquid, and drying the precipitate over a steam bath until it reaches a constant weight.

To simplify determination of the precipitable asphaltenes, the volume of diluent should be between about 2 and about 10 times the volume of the asphalt dispersion. If less than twice as much diluent as dispersion is used, the precipitation may not be complete. In addition, the viscosity may remain too high to permit good settling and the color may be too dark to permit accurate observation of the volume of precipitate. If more than 10 times as much diluent as dispersion is used, either the total volume of liquids must be very large, or the amount of precipitate will be too small to measure accurately.

I have found that if the weight of the dried precipitate is less than about 10 percent of the weight of the asphalt dispersion, poor plugging will result. That is, less than about 50 percent reduction in permeability of the treated portion of the gas zone will generally occur. If about 90 percent or better reduction in permeability of the treated portion of the gas zone is to be obtained, the quantity of precipitate in the test described above should amount to at least about 25 percent of the weight of the asphalt dispersion.

Few crude petroleum oils contain sufficient asphaltenes to produce a precipitate amounting to 25 percent of the weight of the dispersion in the test which I have described. In such cases it may be desirable to increase the amount of asphaltenes in the crude oil. Additional maltenes will generally also be required to maintain the asphaltenes in a peptized colloidal dispersion. Most crude petroleum residues contain asphaltenes and maltenes. Some of these residues, however, are not suitable as sources of concentrated asphaltenes and maltenes since they contain predominantly high molecular weight paraffinic hydrocarbons rather than the saturated and unsaturated ring compounds which are the principal ingredients of the maltenes and asphaltenes. The test described above can be used to determine if a particular residue is suitable as a source of concentrated asphaltenes and maltenes. That is, the residue can be mixed with from about 2 to about 10 times as much diluent as residue. If the amount of asphaltenes which precipitates from the residue is greater than the amount which precipitates from the available asphalt dispersion, then it will be apparent that the residue can be used to increase the effective asphaltene content of the asphalt dispersion.

The compositions of asphaltenes and maltenes can vary widely, depending upon their source and the treatment to which the crude petroleum residue has been subjected. Therefore, it may be found that a particular residue is unsuitable for use with a specific asphalt dispersion. For example, the residue may have been heated to such a high temperature, or air-blown to such an extent, that most of the maltenes have been converted to asphaltenes. In such case the asphaltenes in the residue probably will not disperse in the asphalt vehicle since insufficient maltenes are available to peptize and disperse the asphaltenes. In such cases, some additional peptization and redispersion of asphaltenes may possibly be obtained by adding maltenes to the asphalt and vehicle and agitating vigorously. Concentrated maltenes can be prepared by extracting asphaltic residues with a low boiling hydrocarbon such as pentane and boiling off the pentane from the extract. The actual quantity of maltenes cannot be stated accurately in numbers. If the maltenes present maintain the asphaltenes dispersed for a period of the hour or so necessary to inject the dispersion into the formation, the quantity must be considered sufficient.

Sometimes the flocculation or coagulation of the asphaltenes in a residue may have proceeded to such a degree that additional maltenes alone are not sufficiently effective for redispersing the asphaltenes. In such cases the residue may first be dissolved in a solvent such as carbon disulfide, carbon tetrachloride or the like. The maltenes can then be added followed by evaporation of the solvent. The solvent tends to break the asphaltenes down into particles of approximately molecular dimensions. When the solvent is evaporated, these small asphaltene particles tend to recoagulate but the added maltenes now peptize the small asphaltene particles and limit the growth of these particles. Some residues can be greatly improved as sources of concentrated asphaltenes and maltenes simply by dissolving the residues in a solvent such as carbon disulfide and then evaporating the solvent without mixing in additional maltenes.

From the foregoing, it will be apparent that suitable sources of concentrated asphaltenes and maltenes can be prepared in many ways. Generally, it will be less expensive and more convenient to locate or prepare a carefully steam distilled residue in which the asphaltenes and maltenes are present in substantially the same form and ratio as in the original crude petroleum. Such a residue can almost always be used without difficulty to increase the effective asphaltene content of asphalt dispersions such as asphalt base crude petroleums. A local crude oil will frequently be the most economical and convenient vehicle for the asphalt dispersion. It will sometimes be best, however, to bring in a crude oil from outside the area where it is to be used. This is particularly true if a crude petroleum with a very high asphalt content is available nearby. Crude petroleum oils have two principal defects, however, so it may be advisable to use as the vehicle a petroleum fraction such as kerosene, diesel fuel, or the like. One difficulty with crude oils is that they contain low boiling hydrocarbons. As previously noted, such hydrocarbons tend to remove maltenes from asphaltenes resulting in flocculation of the asphaltenes. It will be apparent, therefore, that higher concentrations of asphaltenes will be much more simply and thoroughly dispersed in the vehicle if the vehicle contains little or no low boiling hydrocarbons. The other difficulty with crude oils is that they usually contain high boiling constituents which are viscous and thus greatly increase the difficulty of introducing the asphaltene dispersion into the formation. A petroleum fraction such as kerosene or diesel fuel contains little, if any, low boiling hydrorarbons, or high boiling viscous materials. In some cases, therefore, it may be most desirable to use such a fraction as the vehicle for the asphalt dispersion. The asphaltene and maltene concentrations can then be adjusted to the desired values as indicated by the dilution test described above.

A petroleum fraction suitable as a vehicle for the asphalt dispersion should preferably boil predominantly above about 450° F. Low boiling fractions used as diluents should preferably boil predominantly below about 400° F. That is, in a standard ASTM distillation, the 50 percent point of the high boiling vehicle should be above about 450° F. while for the low boiling diluent the 50 percent point should be below about 400° F. Preferably, the vehicle should have a 50 percent point of about 550° F. for best results. The preferred diluent should boil around 80° to 100° F. since pentane has been found to produce the optimum degree of asphaltene precipitation. An inexpensive, convenient, and very effective diluent is a low boiling natural gasoline.

Another convenient form of asphalt dispersion can be produced by topping an asphalt base crude oil to remove most of the low boiling hydrocarbons and to increase the concentration of asphaltenes in the remaining oil. If the topped crude petroleum is too viscous it can be diluted with a relatively high boiling petroleum fraction such as kerosene or diesel fuel.

From the foregoing description, it will be apparent that the compositions of the diluent and treating dispersion of asphalt can vary widely and still meet my requirements. For example, if pentane is used as a diluent, it may contain many impurities. When the term "consisting essentially of" is used in connection with a material such as pentane, it should be interpreted to mean the named ingredient or ingredients plus any other materials which do not substantially affect the ability of the named ingredients to perform their intended function. In the case of pentane, for example, that function is precipitating asphaltenes. As another example, when a treating dispersion is described as consisting essentially of a vehicle, asphaltenes, and maltenes, the description should be interpreted to mean these ingredients together with any impurities which do not substantially reduce the ability of the dispersion to decrease the permeability of a formation when the dispersion is contacted by a diluent, such as pentane, in the formation.

In applying my method to a well, the diluent should usually be injected into the formation ahead of the asphalt dispersion. This is particularly true if the gas zone to be treated is closely associated with an oil zone in an oil-producing well. In this case it is important that the oil zone be plugged as little as possible. Whether the diluent or asphalt dispersion is injected first, most of the liquid will enter the gas zone since the injected liquid can displace the gas much more easily than it can displace the oil. If the diluent is injected first, however, and it does enter the oil-producing zone, it will have some tendency to flow over the oil due to the higher density of the oil. In addition, the diluent will generally have a somewhat lower viscosity than the crude oil in the formation. Therefore, the diluent will tend to penetrate the oil and mix with the oil. Then, when the asphalt dispersion is injected, the mixture of oil and diluent will have much less tendency to precipitate asphaltenes than the straight diluent in the gas zone.

If, on the other hand, the asphalt dispersion enters an oil zone first, there will be little tendency to flow over the oil since the densities of the dispersion and oil will be approximately the same. In addition, the viscous dispersion will not tend to penetrate and mix with the less viscous crude oil. Instead, the oil will be displaced ahead of the asphalt dispersion. Then, when the diluent is introduced, both the diluent and asphalt dispersion will be uncontaminated. Thus, they will mix to form a precipitate just as they do in the gas zone. Even in this case the plug in the oil zone will extend from the well to a much smaller distance than it does in the gas zone, but it will be a more complete plug than if the diluent had been injected first.

Even if the gas zone is isolated, the diluent should be injected first. The more viscous asphalt dispersion then displaces the diluent into the formation with less mixing and resulting asphaltene precipitation than if the asphalt dispersion is displaced into the formation ahead of the less viscous diluent. Thus the treating liquids can be injected more easily to a greater distance from the well if the diluent is injected first.

The volume of diluent injected into the formation should be at least as great as the volume of asphalt dispersion. However, the ratio of diluent to asphalt dispersion may vary from about 1 to 5 to about 5 to 1.

The minimum limit is necessary to insure aequate dilution of the treating dispersion. The upper limit is to insure the presence of an adequate volume of precipitate to provide an effective plugging action. Preferably, the ratio of diluent to treating dispersion should be about 2 to 1. The higher ratios are particularly important in deep, high temperature wells. The large volume of diluent flowing over precipitated asphaltenes dissolves the more liquid asphaltenes, leaving a higher concentration of the harder, high melting asphaltenes. The result is a precipitate which has less tendency to soften and flow at the high formation temperatures. Treatments using less diluent than treating dispersion are not preferred since they do not take full advantage of the asphaltene content of the asphalt dispersion.

All of one liquid, either the diluent or asphalt dispersion, may be injected into the formation before any of the second liquid is injected. however, if large volumes are involved it will be apparent that a considerable amount of the last liquid to be injected may flow back into the well without being mixed with the first liquid. To avoid this difficulty the two liquids may be injected in small, alternate slugs. This technique is of particular advantage if gas zones of various permeabilities are present. In this case the liquids at first enter the more permeable zones to a much greater degree than the less permeable ones. As a result, more asphaltenes are precipitated in the more permeable zones by the first slugs of liquids. Subsequent batches then enter the less permeable zones to a greater extent to form plugs which may extend as much as several feet from the well. Without the alternate slug technique, the plugs in less permeable zones may extend only an inch or two from the well. Of course, the more uniform penetration is obtained at the expense of ease of injecting the treating liquids. Therefore, if the zones are of fairly uniform permeability and it is desired to use the slug technique, it may be advisable to use small volumes of liquids such as kerosene, between at least the first batches of diluent and asphalt dispersion in order to avoid excessive mixing near the well bore. These same volumes of spacer liquid also separate the two treating liquids in the tubing to avoid mixing and consequent asphalt precipitation before the liquids enter the formation. Spacers of other liquids such as water or of solid spacers such as rubber, may also be used to separate the batches of diluent and asphalt dispersions in the tubing. Preferably, solid plugs should be oil soluble such as paraffin wax or water soluble such as rock salt, so that they will eventually be dissolved and removed from the well.

Sufficient treating liquids should be used to form a plug extending at least about 5 feet from the well. Otherwise, the length of the plugged zone is so short compared to the total flow path of gas to the well that plugging of the zone around the well has only a minor effect on the rate of flow of gas to the well. In order to form a plug extending an effective distance from the well the quantity of asphalt dispersion should usually be about 50 to 100 gallons per foot of exposed formation. In some cases as little as 10 gallons per foot will produce desirable results. In other cases, use of more than 100 gallons per foot may be justifiable.

Usually the asphalt dispersion and the diluent should be introduced down the tubing with a packer or retainer set between the tubing and casing to prevent contamination of the treating liquids by liquids in the annular space above the zone to be treated. A packer may also be set below the zone to be treated. Other means of isolating limited zones to be treated will occur to those skilled in the art. For example, a liquid, preferably lighter than the treating liquids, may be pumped down the annular space between the tubing and casing while the treating solution is pumped down the tubing. Use of two packers or other means to isolate a zone only 10 or 20 feet long is particularly advisable if a long section of formation is exposed. That is, long sections should preferably be treated about 10 or 20 feet at a time. The asphalt dispersions are usually viscous so the rate of injection should be controlled to avoid developing pressures sufficient to fracture the formation. While my method will normally seal a fracture, particularly if it is packed with sand, fractures are undesirable because they take a large proportion of the asphalt dispersion, leaving little for plugging the matrix permeability to the desired distance from the well. To decrease the danger of fracturing, the viscosity of the treating dispersion should preferably be no more than about 100 centipoises.

Sometimes the asphalt dispersion contains undispersed solids. For example, in an asphalt base crude oil to be used as the asphalt dispersion, some of the asphaltenes may have coagulated. The crude oil may also contain finely divided mineral matter. Such undispersed solids usually filter out on the face of the formation. In most cases the quantity of such solids is insufficient to increase seriously the difficulty of forcing the asphalt dispersion into the formation. If the amount of undispersed solids is great, however, the large solid particles should be allowed to settle out of the dispersion if they will. In case settling is inadequate, the asphalt dispersion may be filtered by any suitable means. Several suitable filters are described in Chemical Engineers' Handbook, 3rd edition (1950), by John H. Perry. For example, plate and frame filters are described on pages 971–976 and continuous filters are shown on pages 976–983. Centrifuges may also be employed although their use is seldom justified. A small volume of solvent for the asphaltenes may help in redispersing any asphaltenes which have flocculated. This amount of solvent should not exceed about 5 percent of the volume of the asphalt dispersion to avoid seriously decreasing the amount of asphaltenes which can be precipitated by a given volume of diluent. Additional maltenes and vigorous agitation may also help to redisperse any coagulated asphaltenes and thus avoid excessive formation of a filter cake on the face of the formation. If a high temperature formation is to be treated, it may be advisable to heat the asphalt dispersion to a temperature near that of the formation before filtering in order to remove any precipitate which might form due to the increased solubility of the maltenes in the lighter portion of the vehicle at elevated temperatures.

My method has been described to this point principally as it applies to plugging gas zones. It will be apparent, however, that the method is also applicable to plugging water-bearing zones penetrated by wells. Since both the fluids necessary for forming the precipitate are injected, the method decreases the permeabilities of all types of formations regardless of the nature of the fluid content.

My invention will be better understood from consideration of the following examples:

EXAMPLE I

The ability of pentane and an asphaltic crude oil to plug a formation was tested as follows. A core 2 inches in diameter and about 30 inches long was drilled parallel to the bedding planes from a sample of the Berea sandstone formation obtained where the formation outcrops near Amherst, Ohio. This core was mounted in a rubber sleeve around which pressure could be applied to seal the sleeve to the core. The ends of the sleeve were clamped in housings which permitted fluids to be injected in one end of the core and withdrawn from the other. The permeability of the clean, dry core to flow of methane saturated with water vapor was determined to be 253 millidarcys. The pore volume of the core was calculated from a pore volume determination made on a small sample taken from the formation near the core. A volume of pentane equal to 40 percent of this pore volume was then injected into the core. This was followed by a volume of crude oil equal to 60 percent of the pore volume. The crude oil was from the Pollard Field in Alabama. Tests had previously shown this crude oil to produce 20 percent by volume of precipitate upon dilution with pentane. Methane was next injected to cause reversal of flow of the pentane and crude oil. Permeability to flow of the methane was again measured when stabilized conditions were noted. The permeability reduction in the injected zone of the core was then calculated. The results are shown in Table A together with results obtained using other ratios of pentane to crude oil, other injection sequences, and other cores. The Torpedo sandstone cores were obtained from an outcrop in Oklahoma, and the Bedford lime cores were obtained from an outcrop in Indiana.

Table A

[INJECTION SEQUENCE: PENTANE FOLLOWED BY CRUDE OIL]

| Core Formation | Permeability, md. | Pentane Injected, Percent Pore Vol. | Crude Injected, Percent Pore Vol. | Permeability Reduction, Percent |
| --- | --- | --- | --- | --- |
| Berea | 253 | 40 | 60 | 57 |

[INJECTION SEQUENCE: CRUDE OIL FOLLOWED BY PENTANE]

| | | | | |
| --- | --- | --- | --- | --- |
| Bedford | 31.5 | 20 | 50 | 69 |
| Torpedo | 124.5 | 20 | 80 | 48.5 |
| Bedford | 35.0 | 50 | 50 | 88 |
| Torpedo | 73.1 | 55 | 50 | 75 |

[INJECTION SEQUENCE: 40% PORE VOLUME PENTANE, CRUDE OIL, 20% PORE VOLUME PENTANE]

| | | | | |
| --- | --- | --- | --- | --- |
| Torpedo | 101 | [1] 40-20 | 40 | 40 |

[1] Split injection of pentane—40 pore volume ahead of crude, 20 percent pore volume behind crude oil.

Many variables were changed in the tests, results of which are reported in Table A. The results varied rather widely as might be expected under the circumstances. In spite of the wide variations in nature and permeability of the formation, amounts and ratios of crude oil and pentane, and injection sequences, however, it will be noted that a fair degree of plugging was obtained in every case. Of course, a much greater degree of plugging than 40 or 50 percent is usually desired. Even more than 88 percent reduction in permeability is advisable in most cases. Therefore, it will generally be desirable to follow the first treatment by a second one to produce a higher degree of plugging. An advantage of my process is that the cost of materials is so low that several treatments can be applied without exceeding economic limits. These treatments can be applied as entirely separate operations or by alternating slugs of pentane or other light solvents such as natural gasoline. It may also be desirable to produce the well between plugging operations to permit oil flow through the oil zones to clean them of plugging agent before a second treatment is applied.

EXAMPLE II

Asphaltenes were precipitated in a core as follows by a hydrocarbon fraction heavier than pentane. The core was about 10 inches long and about 1 inch in diameter. It was cut from Bandera sandstone, a building construction stone obtained from an outcrop in Kansas. The core was sealed in a copper sleeve by heating the copper, inserting the core, and allowing the copper to cool and shrink around the core. The copper-coated sleeve was then mounted in a steel sleeve by the same procedure. Pressure taps were provided every 2 inches to divide the core into five sections. The core was filled with Pollard crude. The permeabilities of the five sections of the core were then determined by measuring pressures at the tapped points while the crude was flowing through the core. A petroleum fraction was then forced into the core. This petroleum fraction boiled from 355° F. to 395° F. with a 50 percent point of about 370° F. in an ASTM distillation. A distinct plugging action was noted. When flow rates had stabilized, permeabilities of the five sections of the core were again measured. The results are reported in Table B.

Table B

| Core Section | Permeability, md. | | Permeability Reduction, Percent |
|---|---|---|---|
| | Before Plugging | After Plugging | |
| 1 | 12.7 | 3.0 | 76 |
| 2 | 11.4 | 8.3 | 27 |
| 3 | 14.8 | 9.6 | 35 |
| 4 | 29.6 | 11.4 | 61 |
| 5 | 14.4 | 8.8 | 39 |

Referring to the percent permeability reductions in the various sections, it will be noted that the first section was more thoroughly plugged than the others. This is believed to be due to hold-up in this section of partially coagulated asphaltenes naturally present in the Pollard crude. The crude oil was filtered through another core before use to decrease this effect as much as possible, but some coagulated asphaltenes apparently remained even after filtration. The reason for the apparently high permeability of Section 4 is not certain. It may have been due to some by-passing of liquids between the core and the copper sleeve in this section, or possibly due to a minor fracture in the core. It will be noted that whatever the cause of the high permeability, the precipitated asphaltenes were unusually effective in decreasing the permeability. Sections 2, 3, and 5 are probably most representative of normal results to be expected. The low degree of plugging was probably due principally to the high boiling nature of the petroleum fraction used as a diluent. Petroleum fractions such as kerosene having a 50 percent boiling point as low as about 470° F. do not precipitate the asphaltenes at all. Thus, it is apparent that the vehicle for the asphaltenes should not be much lower boiling than kerosene (boiling predominantly above about 450° F.) while the diluent used for precipitating the asphaltenes should not boil predominantly above about 400° F.

EXAMPLE III

The suitabilities of several crude oils as asphaltene dispersions and of a few solvents as asphaltene precipitating diluents were tested as follows. One volume of the crude oil was diluted with nine volumes of the solvent. The diluted oil was then centrifuged to force rapid and complete settling of the precipitate. The liquid was decanted from the precipitated asphaltenes. The precipitate was then dried at about 100° C. to drive off the remaining pentane. Finally, the volume of the asphaltenes was measured and the percent by volume of precipitate was calculated based on the original volume of crude oil. The results are presented in Table C.

Table C

| Crude Oil | Solvent | Vol. percent Precipitate |
|---|---|---|
| Long Field, Nebraska | Pentane | 0 |
| Grass Creek Field, Wyoming | do | 10 |
| Cottonwood Creek, Wyoming | do | 1 |
| Little Buffalo Basin, Wyoming | do | 15 |
| Enders Field, Nebraska | do | 0 |
| Torchlight Field, Wyoming | do | 20 |
| Winkleman Dome Field, Wyoming | do | 0 |
| Roosevelt Field, Utah | do | 18 |
| Pollard Field, Alabama | do | 20 |
| Do | $C_{10}$–$C_{12}$ | 20 |
| Do | Kerosene | 0 |

The solvent called $C_{10}$–$C_{12}$ was the previously-mentioned petroleum fraction boiling between about 355° F. and about 395° F., with a 50 percent point of about 370° F. The kerosene had a 50 percent boiling point of about 470° F. The data in Table C show that several crude oils are available which form sufficient precipitate when diluted by a light solvent to produce an effective plug in a formation. The data also demonstrate the suitability of this test for selecting satisfactory crude oils for use in my plugging method. A comparison of the results using the $C_{10}$–$C_{12}$ fraction to the results using kerosene serve to define the limit between petroleum fractions suitable as vehicles for colloidal asphaltene dispersions and those suitable for precipitating asphaltenes by dissolving the maltenes.

EXAMPLE IV

The effects of asphaltene solvents in the asphaltene dispersions were determined by adding various amounts of carbon tetrachloride to Pollard crude and then adding pentane to precipitate the asphaltenes. In this case the pentane was added in small amounts. The precipitate formed by each batch of pentane was removed by filtration before the next batch of pentane was added. Batches of pentane were added until no further precipitation occurred. The total amount of precipitate was then determined. The amount of precipitate, together with the degree of dilution required to produce the maximum precipitate, is reported in Table D.

Table D

| Amount of $CCl_4$ Added to Crude Oil, wt. Percent | Precipitate Formed, wt. Percent of Crude Oil | Amount Pentane Required, wt. Percent |
|---|---|---|
| 0 | 19.8 | 830 |
| 5 | 15.0 | 260 |
| 10 | 9.7 | 260 |
| 15 | 6.1 | 260 |
| 25 | 5.4 | 260 |
| 50 | 5.5 | 260 |

The limited amount of precipitate obtainable from crude oil containing more than about 5 percent of a good asphaltene solvent, such as carbon tetrachloride, is apparent from Table D. This is the basis for limiting the amount of such solvents to about 5 percent. It will also be noted, however, that 5 percent carbon tetrachloride caused quick formation of the precipitate. A possible explanation is that the carbon tetrachloride is a good solvent for maltenes as well as asphaltenes. Therefore, a little carbon tetrachloride may decrease the volume of pentane required to dissolve sufficient maltenes from the asphaltenes to permit precipitation of the latter.

EXAMPLE V

To check further the effects of carbon tetrachloride in Pollard crude oil, core plugging tests were conducted as described in Example I except that in every case 5 percent by volume of carbon tetrachloride was added to the Pollard crude oil. The injection sequence was crude oil followed by pentane. Results are reported in Table E.

Table E

| Core Formation | Permeability, md. | Pentane Injected, Percent Pore Vol. | Crude Injected, Percent Pore Vol. | Permeability Reduction, Percent |
|---|---|---|---|---|
| Torpedo | 104.7 | 15 | 50 | 82.0 |
| Berea | 270 | 20 | 50 | 84.5 |
| Berea | 267 | 25 | 50 | 82.0 |

The plugging effectiveness of the Pollard crude oil diluted with carbon tetrachloride was obviously quite good in spite of the decreased amount of precipitate available in the presence of the asphaltene solvent. The explanation is not certain, but again it may be due to the solvent power of the carbon tetrachloride for the maltenes. Whatever the explanation, it is apparent that an asphaltic crude oil, such as Pollard crude, can contain up to about 5 percent of an asphaltene solvent such as carbon tetrachloride and still produce a good plugging action.

EXAMPLE VI

To determine how effectively flow of oil would remove an asphaltene plug from an oil-producing zone, a Torpedo core was plugged by the method described in Example I. In this method a volume of pentane equal to 10 percent of the core pore volume was first injected. This was followed by a volume of Pollard crude equal to 55 percent of the pore volume. The original permeability of the core was 105.5 millidarcys. After plugging, kerosene was pumped through the plugged core. Table F shows the permeability of the core after various amounts of kerosene had flowed through the core.

Table F

| Pore Volumes Kerosene Through Core | Permeability, md. | Percent of Original Permeability |
|---|---|---|
| 3.5 | 46.1 | 43.6 |
| 8.0 | 52.4 | 49.6 |
| 10.0 | 69.1 | 65.5 |
| 20.0 | 86.2 | 81.6 |
| 30.0 | 103.2 | 98.0 |

The data in Table F indicate that the asphaltene plug is selective to gas and water zones since oil flowing through a plugged formation restores the original permeability. A considerable volume of kerosene was required, but smaller volumes of higher boiling crude oils would be needed.

I claim:

1. A method for decreasing the permeability of a zone of a formation penetrated by a well comprising separately injecting a pumpable treating dispersion and a diluent into said zone in a ratio of about 1 to 5 to a ratio of about 5 to 1, said diluent being a liquid which is a selective solvent for maltenes and capable of precipitating asphaltenes from said treating dispersion, and said treating dispersion consisting essentially of a hydrocarbon liquid boiling predominantly above about 450° F., asphaltenes in an amount sufficient to form a precipitate amounting to at least about 10 percent by weight of the treating dispersion when diluted with from about 2 to about 10 times as much diluent as treating dispersion, and maltenes in an amount sufficient to hold said asphaltenes peptized in the colloidal state in said vehicle in the absence of said diluent.

2. The method of claim 1 in which said diluent is a hydrocarbon liquid boiling predominantly below about 400° F.

3. The method of claim 1 in which said diluent consists essentially of pentane.

4. The method of claim 1 in which said treating dispersion has a viscosity less than about 100 centipoises.

5. The method of claim 1 in which said injections of diluent and treating dispersion are repeated to increase the degree of plugging.

6. A method for selectively decreasing the permeability of a gas-producing zone of an oil-producing formation comprising separately injecting a pumpable treating dispersion and a diluent into said zone in a ratio of about 1 to 5 to a ratio of about 5 to 1, said diluent being a liquid which is a selective solvent for maltenes and capable of precipitating asphaltenes from said treating dispersion, and said treating dispersion consisting essentially of a hydrocarbon liquid boiling predominantly above about 450° F., asphaltenes in an amount sufficient to form a precipitate amounting to at least about 10 percent by weight of the treating dispersion when diluted with from about 2 to about 10 times as much diluent as treating dispersion, and maltenes in an amount sufficient to hold said asphaltenes peptized in the colloidal state in said vehicle in the absence of said diluent, and finally producing said well whereby oil flowing through the partially plugged oil zone removes the asphaltenes from the oil zone and restores the permeability to flow of oil.

7. The method of claim 6 in which said diluent is a hydrocarbon liquid boiling predominantly below about 400° F.

8. The method of claim 6 in which said diluent consists essentially of pentane.

9. The method of claim 6 in which said treating dispersion has a viscosity less than about 100 centipoises.

10. The method of claim 6 in which said injection and producing steps are repeated to form a more complete plug of said gas-producing zone while said oil zone retains substantially its original permeability.

References Cited in the file of this patent

UNITED STATES PATENTS 2,713,906    Allen    July 26, 1955